US007450829B2

(12) United States Patent
Kim

(10) Patent No.: US 7,450,829 B2
(45) Date of Patent: Nov. 11, 2008

(54) COMBINATION SYSTEM CAPABLE OF COMPENSATING FOR DRIVING INFORMATION OF ONE CHIP AND METHOD THEREOF

(75) Inventor: Hyoung-nam Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1166 days.

(21) Appl. No.: 10/811,944

(22) Filed: Mar. 30, 2004

(65) Prior Publication Data
US 2005/0031316 A1    Feb. 10, 2005

(30) Foreign Application Priority Data
Aug. 6, 2003    (KR) .................. 10-2003-0054315

(51) Int. Cl.
*H04N 5/91* (2006.01)
(52) U.S. Cl. ...................... 386/125; 386/126
(58) Field of Classification Search .......... 386/46, 386/95, 112, 116, 125, 126
See application file for complete search history.

(56) References Cited

U.S. PATENT DOCUMENTS

| | | | | |
|---|---|---|---|---|
| 5,293,388 | A | 3/1994 | Monroe et al. ............ | 371/37.1 |
| 5,544,145 | A | 8/1996 | Muraoka et al. ........... | 369/125 |
| 5,812,883 | A | 9/1998 | Rao ......................... | 395/8.94 |
| 2002/0064370 | A1* | 5/2002 | Berkheimer et al. ......... | 386/52 |
| 2002/0172495 | A1* | 11/2002 | Han .......................... | 386/46 |

FOREIGN PATENT DOCUMENTS

| | | |
|---|---|---|
| DE | 3243812 | 5/1984 |
| EP | 1280154 | 1/2003 |
| JP | 58106975 | 6/1983 |
| JP | 03-071232 | 3/1991 |
| JP | 03-186927 | 8/1991 |
| JP | 05-035457 | 2/1993 |
| JP | 08-255009 | 1/1996 |
| JP | 11-296364 | 10/1999 |
| JP | 2002-344837 | 11/2002 |

* cited by examiner

*Primary Examiner*—Huy T Nguyen
(74) *Attorney, Agent, or Firm*—Roylance, Abrams, Berdo & Goodman

(57) ABSTRACT

A Digital Video Disc Player/Video Cassette Recorder (DVDP/VCR) combination system having a DVDP and a VCR provided with a DVDP driving information storage unit and a VCR driving information storage unit. The DVDP/VCR combination system controls the DVDP and the VCR in accordance with DVDP driving information and VCR driving information stored in the DVDP driving information storage unit and the VCR driving information storage unit, respectively. The DVDP/VCR combination system includes a deck unit for reading correction information for compensating for the DVDP driving information and/or the VCR driving information from a DVD, a DVDP correction information storage unit for receiving and storing VCR correction information among the read correction information, a switching signal input unit for inputting a switching signal for switching driving according to the DVDP driving information over to driving according to the VCR correction information, and a VCR control unit for controlling the VCR by switching over to driving according to the VCR correction information stored in the VCR correction information storage unit if the switching signal is received through the switching signal input unit.

18 Claims, 4 Drawing Sheets

COMBINATION SYSTEM CAPABLE OF COMPENSATING FOR DRIVING INFORMATION OF ONE CHIP AND METHOD THEREOF

CROSS-REFERENCE TO RELATED APPLICATIONS

This application claims the benefit of Korean Patent Application No. 2003-54315 filed Aug. 6, 2003, in the Korean Intellectual Property Office, the disclosure of which is incorporated herein by reference.

BACKGROUND

1. Field of the Invention

The present invention relates to a combination system using a single chip and a method of compensating for driving information, and more particularly, to a combination system using a single chip and a method of compensating for driving information if an error occurs in the driving information stored in the single chip of the combination system.

2. Description of the Related Art

A semiconductor that contains an Integrated Circuit (IC) for performing the functions of a Central Processing Unit (CPU), a Random Access Memory (RAM), a Read Only Memory (ROM), a timer, an analog-to-digital (A/D) converter, etc., is called a single chip or one chip.

The one-chip design can simplify the addition of peripheral components due to its improved performance compared to a circuit having separate components, and thus has been used as the essential core component. An electronic appliance using a one-chip may be a microwave oven, a Video Tape Recorder (VTR), and a Digital Video Disc Player/Video Cassette Recorder (DVDP/VCR) combination system.

FIG. 1 is a block diagram illustrating an example of a conventional DVDP/VCR combination system. Referring to FIG. 1, the DVDP/VCR combination system 100 includes a VCR unit 110 for performing a general function of a VCR, a DVDP unit 120 for performing a general function of a DVDP, a selection unit 130 for performing a selection operation with respect to signals output from the VCR unit 110 and the DVDP unit 120, an input unit 140 for providing signals input from external appliances such as a camcorder to the selection unit 130, an output unit 150 for providing the signals output from the VCR unit 110 and the DVDP unit 120 to peripheral appliances such as a television receiver (TV), an amplifier, etc., and an On-Screen Display (OSD) block 160 for adding an OSD function to video signals output from the VCR unit 110 and the DVDP unit 120.

The VCR unit 110 includes a VCR deck 111 for recording a signal on a magnetic tape or reproducing a signal recorded in the magnetic tape, a video block 112 and an audio block 113 for processing video and audio signals to be recorded and reproduced through the VCR deck 111, and a VCR one-chip 114 for controlling the VCR deck 111, the video block 112 and the audio block 113. The VCR one-chip 114 includes a VCR driving information storage unit 114a for storing driving information for controlling constituent elements of the VCR unit 110, i.e., a program for controlling the VCR unit 110, and a VCR control unit 114b for controlling the components of the VCR unit 110 in accordance with the driving information stored in the VCR driving information storage unit 114a. Also, the VCR unit 110 is provided with a display 116 for displaying status information of the VCR unit 110 such as operation, control, mode, etc., to allow a user to recognize the status information, a manipulation panel 117 for receiving various commands from the user, and a remote control sensor 118 for receiving various commands from the user through a remote controller 180.

The DVDP unit 120 includes a DVD deck 121, a DVD servo 122, a DVD one-chip 123, an Moving Picture Expert Group (MPEG) decoder 124, and a DVDP correction information storage unit 125. Also, the DVD one-chip 123 includes a DVDP driving information storage unit 123a and a DVDP control unit 123b.

The DVD deck 121 operates to read data recorded in the DVD in order to perform a reproducing operation of the DVD, and the DVD servo 122 performs a position control and a speed control of the DVD deck 121. Also, the DVD deck 121 reads DVDP correction information for compensating for DVDP driving information from a recording medium in which the DVDP correction information is recorded, i.e., a DVD, an error is found in the DVDP driving information stored in the DVDP driving information storage unit 123a after the DVDP/VCR combination system is produced.

The MPEG decoder 124 receives the data read by the DVD deck 121 through the DVD control unit 123, and output DVD video data and DVD sound data. The DVDP driving information storage unit 123a stores driving information for controlling the DVDP unit 120. The DVD control unit 123 reads the DVDP driving information stored in the DVDP driving information storage unit 123a, and control the DVD deck 121, the DVD servo 122 and the MPEG decoder 124 of the DVDP unit 120. The DVDP correction information storage unit 125 stores the DVDP correction information read by the DVD deck 121 if an error occurs in the DVDP driving information stored in the DVDP driving information storage unit 123a. The DVDP correction information storage unit 125, is distinct from the DVDP driving information storage unit 123a provided inside the DVDP one-chip 123, and is installed separate from the DVDP one-chip 123. Also, the DVDP correction information storage unit 125 is implemented using an Electrically Erasable and Programmable ROM (EEPROM) or a flash ROM which can erase the previously stored data and update new data. If an error is found in the DVDP driving information stored in the DVDP driving information storage unit 123a after the DVDP/VCR combination system is produced, the DVDP control unit 123b compensates for the damaged DVDP driving information by controlling the DVDP unit 120 in accordance with the DVDP correction information stored in the DVDP correction information storage unit 125.

The selection unit 130 receives an output of the MPEG decoder 124, outputs of the video and audio blocks 112 and 113, and a signal from the input unit 140. The selection unit 130 performs a selection operation with respect to the input signals under the control of the VCR control unit 114 and the DVD control unit 123, and an output of the selection unit 130 is input to the OSD block 160 and the output unit 150.

The OSD block 160 serves to add the OSD function to the signal input from the selection unit 130. Accordingly, an operation pattern menu for controlling the DVDP unit 120 and the VCR unit 110 and an image to be added to the image signal output to the TV screen such as a menu for setting such an operation pattern, are provided by the OSD block 160.

The output unit 150 receives signals from the DVD encoder 124, the selection unit 130 and the OSD block 160, and outputs signals related to a DVD image, DVD sound, VCR image and VCR sound. The output unit 150 is connected to peripheral appliances such as a TV, audio appliance, etc., so that the images and the sounds are output through the peripheral appliances.

The input unit 140 is connected to the selection unit 130, and serves to transfer the externally input signals to the selection unit 130. Signal output terminals of external appliances such as a camcorder and so on are connected to the input unit 140. Accordingly, signals recorded in the external appliances can be transmitted to the combination system 100 through the input unit 140, and can also be recorded on the magnetic tape using the VCR unit 110 or reproduced through the TV.

According to the conventional DVDP/VCR combination system, although the DVDP driving information can be compensated for by reading the DVDP correction information from the DVD having the DVDP correction information recorded therein if an error is found in the DVDP driving information after the DVDP/VCR combination system is produced, it is difficult to compensate for the VCR driving information by reading the VCR correction information from the VCR that is a magnetic recording medium if an error is found in the VCR driving information in the VCR one-chip 114. This requires the set of the DVDP/VCR combination system be opened, respective parts be disassembled, and the VCR one-chip be replaced. This is inconvenient. Also, even if an error is found only in the VCR driving information stored in the VCR one-chip and other functions of the one-chip are normal after the DVDP/VCR combination system is produced, the one-chip itself should be replaced. This results in a loss in time and an increase in cost to replace the one-chip.

SUMMARY

Accordingly, it is an objective of the present invention to provide a combination system using a single chip and a method of compensating for driving information if an error occurs in the driving information stored in the single chip of the combination system.

In order to substantially achieve the above objective, a Digital Video Disc Player/Video Cassette Recorder (DVDP/VCR) combination system is provided having a DVDP and a VCR, each of which has one chip provided with a DVDP driving information storage unit and a VCR driving information storage unit. The DVDP/VCR combination system controls the DVDP and the VCR in accordance with DVDP driving information and VCR driving information stored in the DVDP driving information storage unit and the VCR driving information storage unit, respectively. The DVDP/VCR combination system comprises a deck unit for reading correction information for compensating for the DVDP driving information and/or the VCR driving information from a DVD; a DVDP correction information storage unit for receiving and storing VCR correction information among the read correction information; a switching signal input unit for inputting a switching signal for switching a driving according to the DVDP driving information over to a driving according to the VCR correction information; and a VCR control unit for controlling the VCR by switching over to the driving according to the VCR correction information stored in the VCR correction information storage unit if the switching signal is received through the switching signal input unit.

BRIEF DESCRIPTION OF THE DRAWINGS

The above objects and other advantages of the present invention will become more apparent by describing in detail an embodiment thereof with reference to the attached drawings in which.

DETAILED DESCRIPTION OF THE PREFERRED EMBODIMENTS

Figure 1:
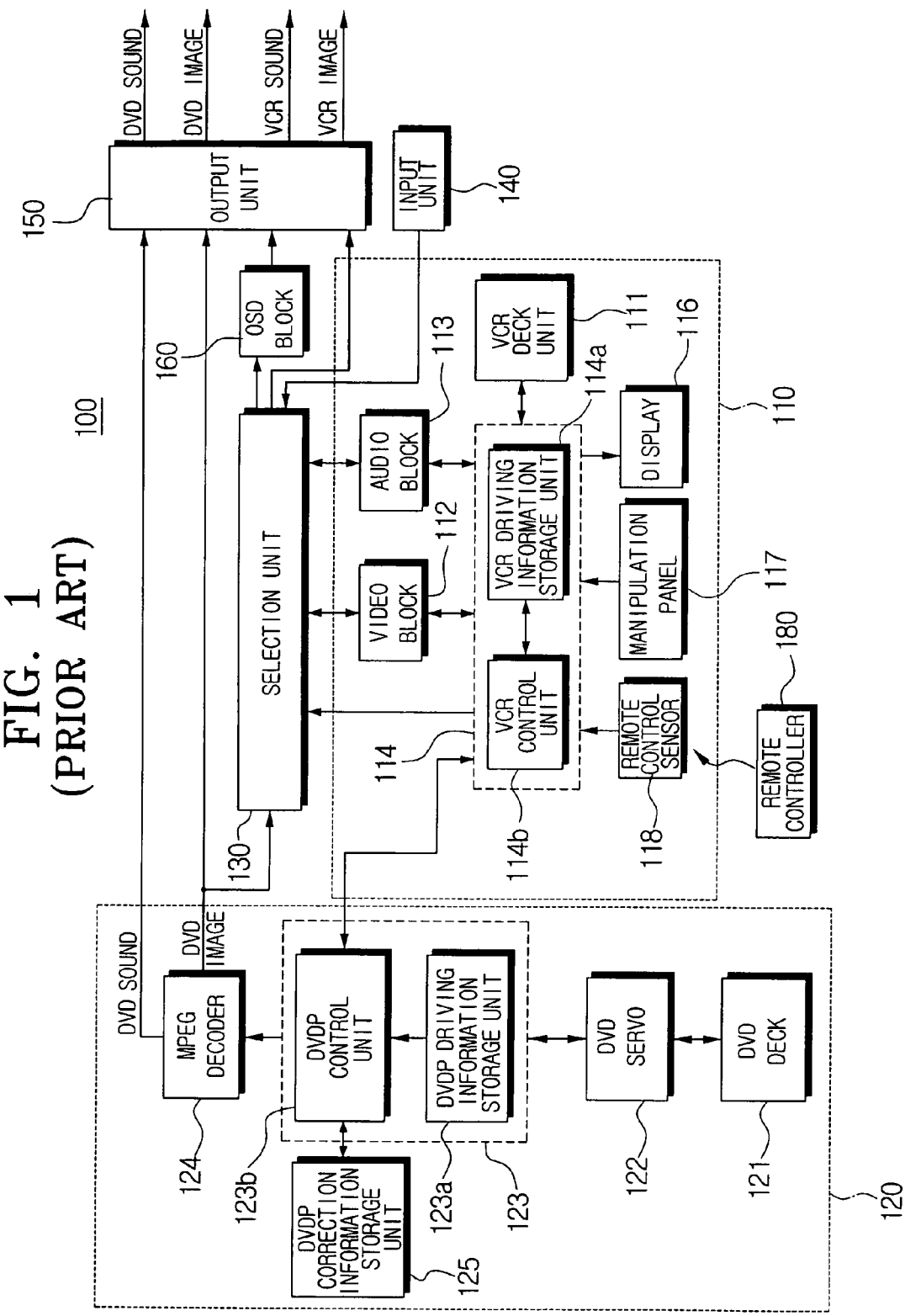
FIG. 1 is a block diagram illustrating an example of a conventional Digital Video Disc Player/Video Cassette Recorder (DVDP/VCR) combination system.

Now, a combination system using a single chip and a method of compensating for driving information thereof according to an embodiment of the present invention will now be described in detail with reference to the accompanying drawings in which like reference numerals refer to like elements.

Figure 2:
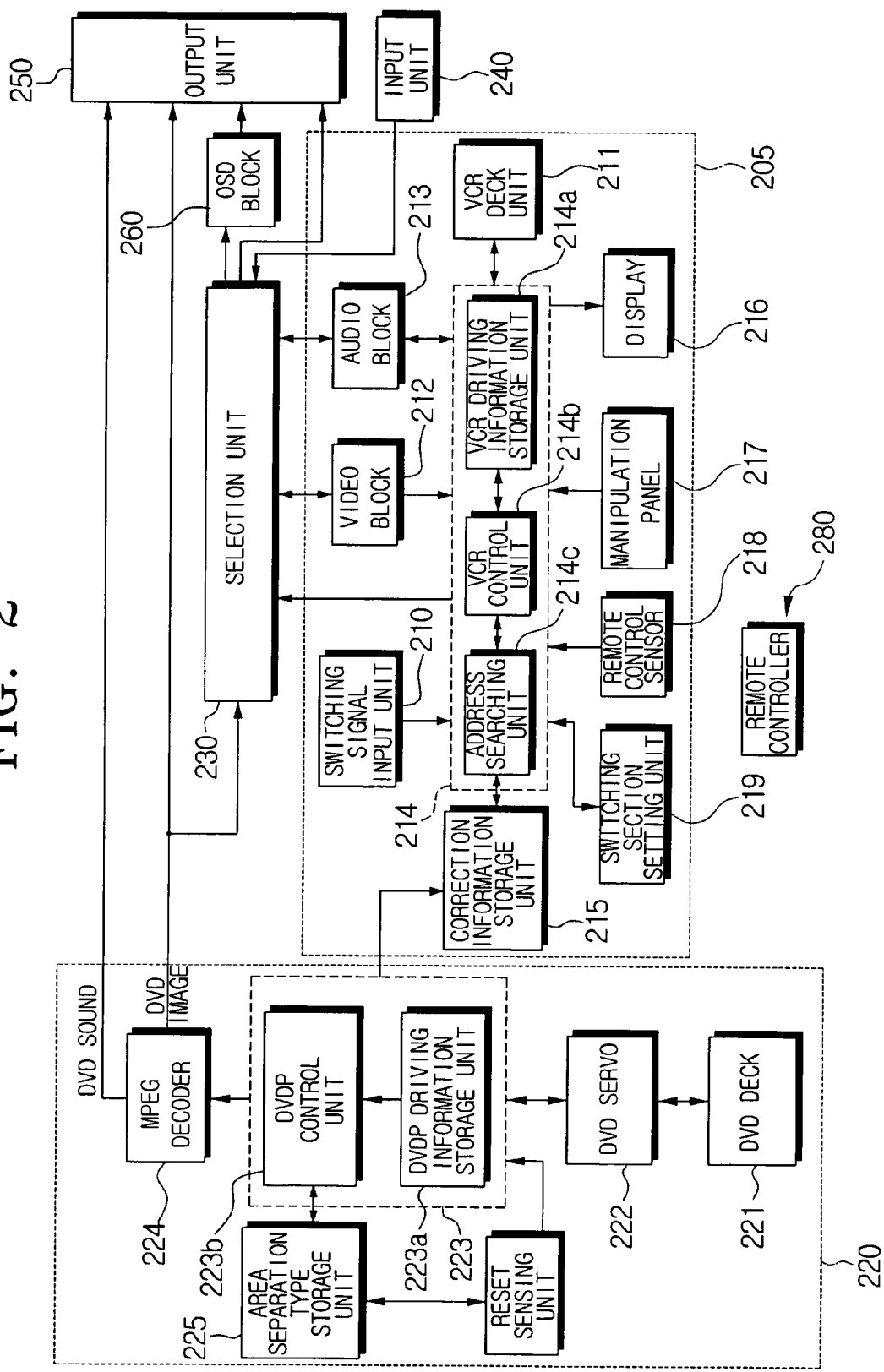
FIG. 2 is a block diagram schematically an example of a DVDP/VCR combination system according to an embodiment of the present invention.

FIG. 2 is a block diagram illustrating an example of a Digital Video Disc Player/Video Cassette Recorder (DVDP/VCR) combination system according to an embodiment of the present invention. Hereinafter, a DVDP/VCR combination system having a DVDP and a VCR as first and second appliances will be explained as an example of the combination system according to an embodiment of the present invention. Referring to FIG. 2, the DVDP/VCR combination system includes a VCR unit 205 for performing a function of a VCR, a DVDP unit 220 for performing a general function of a DVDP, a selection unit 230 for performing a selection operation with respect to signals output from the VCR unit 205 and the DVDP unit 220, an input unit 240 for providing signals input from external appliances such as a camcorder to the selection unit 230, an output unit 250 for providing the signals output from the VCR unit 205 and the DVDP unit 220 to peripheral appliances such as a TV, an amplifier, etc., and an On-Screen Display (OSD) block 260 for adding an OSD function to video signals output from the VCR unit 205 and the DVDP unit 220.

The VCR unit 205 includes a switching signal input unit 210, a VCR deck unit 211, a video block 212, an audio block 213, a VCR one-chip 214, a VCR correction information storage unit 215, a display 216, a manipulation panel 217, a remote control sensor 218, and a switching section setting unit 219. Also, the VCR one-chip 214 includes a VCR driving information storage unit 214a, a VCR control unit 214b, and an address searching unit 214c.

The DVDP unit 220 includes a DVD deck unit 221, a DVD servo 222, a DVD one-chip 223, an Moving Picture Expert Group (MPEG) decoder 224, and an area separation type storage unit 225. The DVDP one-chip 223 includes a DVDP driving information storage unit 223a and a DVDP control unit 223b.

Here, the construction and operation of the VCR deck unit 211, video block 212, audio block 213, manipulation panel 217, remote control sensor 218, selection unit 230, output unit 250, input unit, OSD block 260, DVD servo 222, and MPEG decoder 224 are the same as described above, and the explanation thereof will be omitted.

The switching signal input unit 210 inputs a switching signal for switching a control of the VCR unit 205 according to the driving information stored in the VCR driving information storage unit 214a over to a control of the VCR unit 205 according to correction information stored in the VCR correction information storage unit 215.

The VCR driving information storage unit 214a is provided inside the VCR one-chip 124, and stores the driving information for driving the VCR unit 205, i.e., a program for controlling the VCR unit 205 of the DVDP/VCR combination system. Here, it is preferable that the VCR driving information storage unit 214a is provided with a predetermined area where correction is possible by a user of the DVDP/VCR combination system, and a specified address is given to the allocated area.

If a switching signal is received through the switching signal input unit 210, the VCR control unit 214b controls the VCR unit 205 by switching over to the driving according to the VCR correction information stored in the VCR correction information storage unit 215.

The address searching unit 214c, in the case of controlling the VCR unit 205 by switching the driving according to the VCR driving information stored in the VCR driving information storage unit 214b to the driving according to the VCR correction information stored in the VCR correction information storage unit 215, searches for a section of the VCR correction information that coincides with a section of the VCR driving information to be switched.

If an error occurs in the VCR driving information stored in the VCR driving information, the VCR correction information storage unit 215 stores the correction information for compensating for the VCR driving information. It is preferable that the VCR correction information storage unit 215 is installed separate from the VCR one-chip 214 and is distinct from the VCR driving information storage unit 214a provided inside the VCR one-chip 214. It is also preferable that the VCR correction information storage unit 215 is implemented using an Electrically Erasable and Programmable ROM (EEPROM) or a flash Read Only Memory (ROM) so that the existing stored data can be erased and new data can be uploaded.

The display 216 displays the VCR driving information stored in the VCR driving information storage unit 214a or the DVDP driving information stored in the DVDP driving information storage unit 223a. The display of the driving information using the display 216 may be performed during the driving of the VCR unit 205 or the DVDP unit 220 or by a user's driving information display command. The user of the DVDP/VCR combination system can designate a correction section of the VCR driving information or the DVDP driving information displayed on the display 216. Hereinafter, since the correction section of the VCR driving information or the DVDP driving information designated by the user refers to the section where the driving according to the VCR driving information or the DVDP driving information switches over to the driving according to the VCR correction information or the DVDP correction information, it is called a 'switching section'. Also, if an error occurs in the DVDP driving information, the same technology as that used in the conventional DVDP/VCR combination system is used, and thus the explanation thereof will be omitted while only the compensation of an improved VCR driving information will now be explained.

The switching section setting unit 219 sets the switching section for switching the driving according to the VCR driving information displayed on the display 216 over to the driving according to the VCR correction information stored in the VCR correction information storage unit 215. In this case, the switching section setting unit 219 sets the switching section by designating a start address and an end address of an area, which is to be corrected, of the VCR driving information displayed on the display 216. Here, the user of the DVDP/VCR combination system may allocate a correction area to the VCR driving information instead of designating the switching section of the VCR driving information, and the switching section setting unit 219 may automatically designate an address of an area of the VCR correction information corresponding to the correction area of the VCR driving information.

If the user of the DVDP/VCR combination system intends to compensate for the VCR driving information stored in the VCR driving information storage unit 214a or the DVDP driving information stored in the DVDP driving information storage unit 223a after the DVDP/VCR combination system is produced, the user records the VCR correction information and/or DVDP correction information to be compensated for on the DVD, and inserts the DVD in the DVD deck unit 221 of the DVDP/VCR combination system. The DVD deck unit 221 reads the DVDP driving information, the VCR correction information for compensating for the VCR driving information or the DVDP correction information from the DVD, and stores the readout correction information in the area separation type storage unit 225.

The area separation type storage unit 225 is provided with a VCR correction information area for storing the VCR correction information and a DVDP correction information area for storing the DVDP correction information among the correction information read from the DVD. It is preferable that the area separation type storage unit 225 is installed separate from the DVDP one-chip 223 is distinct from the DVDP driving information storage unit 223a provided inside the DVDP one-chip 223. It is also preferable that the area separation type storage unit 225 is implemented using an EEPROM or a flash ROM so that the existing stored data can be erased and new data can be uploaded. Hereinafter, the area separation type storage unit 225 is called a DVDP correction information storage unit in order to distinguish it from the VCR correction information storage unit 214a of the VCR unit 205.

The reset-sensing unit 226 detects the reset of the DVDP/VCR combination system. If the DVDP/VCR combination system is reset, the reset-sensing unit 226 informs the DVDP control unit 223b by transmitting a reset-sensing signal to the DVDP control unit 223b. If the reset-sensing signal is received from the reset-sensing unit 226, the DVDP control unit 223b transmits the VCR correction information stored in the VCR correction information area of the area separation type storage unit 225 to the VCR correction information storage unit 215, so that the VCR correction information stored in the VCR correction information storage unit 215 can be uploaded.

Although the first appliance has been described as a DVDP and the second appliance has been described as a VCR, the combination system according to the embodiment of the present invention is not limited to a DVDP/VCR combination system, but diverse types of combination systems can be implemented. For example, the first appliance of the combination system may be a digital TV (DTV), and the second appliance may be a VCR.

Figure 3:
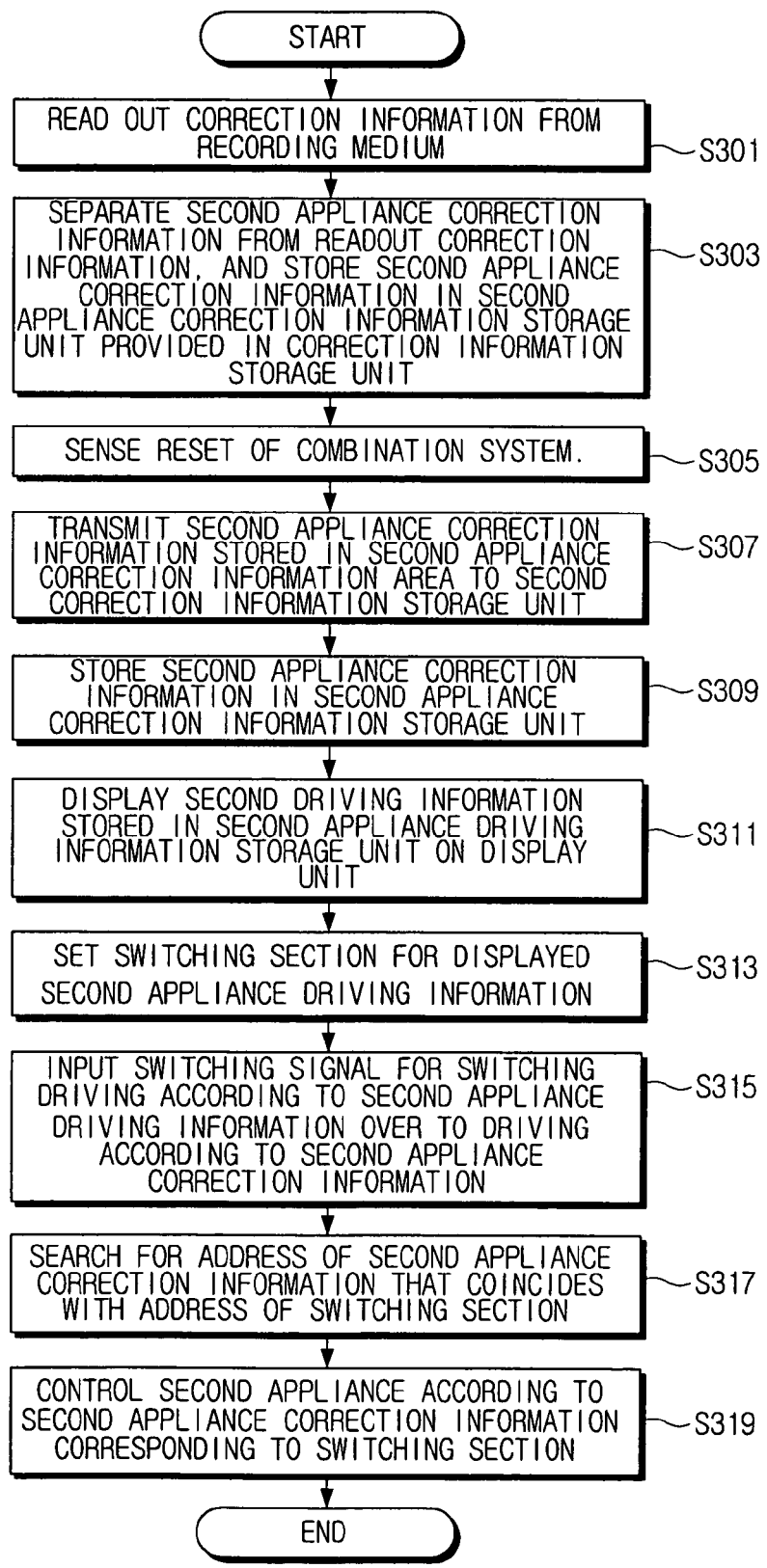
FIG. 3 is a flowchart illustrating an example of a method of compensating for driving information performed by the system of FIG. 2 according to an embodiment of the present invention.

FIG. 3 is a flowchart illustrating a method of compensating for driving information performed by the system of FIG. 2 according to an embodiment of the present invention.

Referring to FIG. 3, if an error is found in the DVDP driving information or in the VCR driving information after the DVDP/VCR combination system is produced, the user of the DVDP/VCR combination system records the DVDP correction information or the VCR correction information to be compensated for in the DVD, and inserts the DVD in the DVD deck unit 221.

The DVD deck unit 221 reads the DVDP correction information and the VCR correction information from the inserted DVD (step S301). The DVDP control unit 223a separates and stores the readout DVDP correction information and the VCR correction information in the DVDP correction information area and the VCR correction information area provided in the area separation type storage unit 225, respectively (step S303).

The reset-sensing unit 226 detects the reset of the DVDP/VCR combination system (step S305). If the reset of the DVDP/VCR combination system is detected through the reset-sensing unit 226, the DVDP control unit 223b receives the reset-sensing signal from the reset-sensing unit 226, and transmits the DVDP correction information stored in the area separation type storage unit 225 to the VCR correction information storage unit 215 corresponding to the received reset-sensing signal (step S307). As a result, whenever the DVDP/VCR combination system is reset, the DVDP control unit 223b searches whether the VCR correction information is stored in the area separation type storage unit 225, and transmits the searched VCR correction information to the VCR correction information storage unit 215.

The VCR correction information storage unit 215 stores the received VCR correction information (step S309). The display 216 displays the VCR driving information stored in the VCR driving information storage unit 214a (step S311). The display of the VCR driving information through the display 216 may be performed during the driving of the VCR unit 205 by the VCR driving information or by a display command of the user of the DVDP/VCR combination system.

If an error is found in the VCR driving information displayed on the display 216, the user of the DVDP/VCR combination system sets the switching section with respect to the VCR driving information through the switching section setting unit 219 as the user is viewing the VCR driving information displayed on the display (step S313). In this case, the switching section of the VCR driving information is set through the designating of a start address and an end address of an area, which is to be corrected, of the VCR driving information. Also, the user of the DVDP/VCR combination system inputs a switching signal for switching the driving of the VCR unit 205 by the VCR driving information stored in the VCR driving information storage unit 214a over to the driving of the VCR unit 205 by the VCR correction information stored in the VCR correction information storage unit 215 through the switching signal input unit 210 (step S315).

Figure 4:
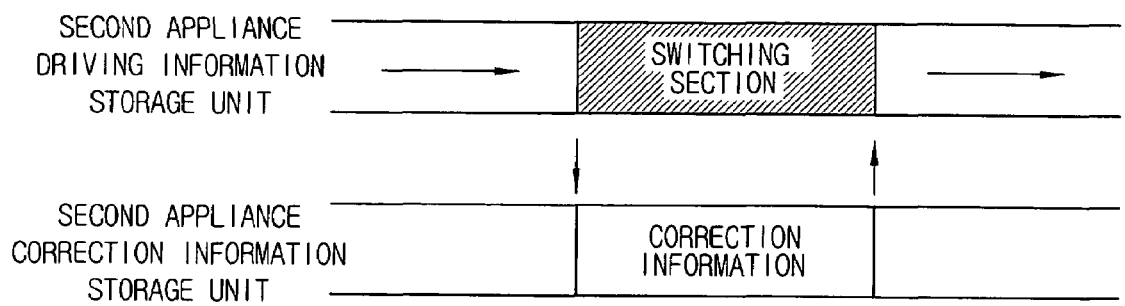
FIG. 4 is a diagram illustrating an example of explaining the method illustrated in FIG. 3 according to an embodiment of the present invention.

If the switching signal is input through the switching signal input unit 210, the address searching unit 214c searches for the address of the correction information that coincides with the address of the switching section from the VCR correction information storage unit 215 (step S317). If the address of the correction information that coincides with the address of the switching section through the address searching unit 214c, the VCR control unit 214b drives the VCR unit 205 according to the correction information that corresponds to the switching section, i.e., the correction information of the searched address section (step S319). If the driving of the VCR unit 205 by the correction information section that corresponds to the switching section is completed, the VCR control unit 214b again drives the VCR unit 205 by the VCR driving information stored in the VCR driving information storage unit 214a. In this case, the start point of the returned driving information becomes the address that corresponds to the end point of the switching section (See FIG. 4).

As described above, the DVDP/VCR combination system according to the embodiment of the present invention can compensate for the VCR driving information without replacing the VCR one-chip if an error occurs in the driving information stored in the VCR driving information storage unit in the VCR one-chip.

According to the embodiment of the present invention, since the driving information can be compensated for through a simple procedure without replacing the VCR one-chip itself if an error occurs in the driving information stored in the VCR one-chip in the DVDP/VCR combination system, the cost for replacing components and the time required for correcting the driving information can be reduced.

While the present invention has been described in detail, it should be understood that various changes, substitutions and alterations can be made hereto without departing from the spirit and scope of the invention as defined by the appended claims.

What is claimed is:

1. A Digital Video Disc Player/Video Cassette Recorder (DVDP/VCR) combination system has a DVDP and a VCR provided with a DVDP driving information storage unit and a VCR driving information storage unit, respectively, the DVDP/VCR combination system being adapted to control the DVDP and the VCR in accordance with DVDP driving information and VCR driving information stored in the DVDP driving information storage unit and the VCR driving information storage unit, respectively, the DVDP/VCR combination system comprises:
   a deck unit for reading correction information for compensating for at least one of the DVDP driving information and or the VCR driving information from a DVD;
   a DVDP correction information storage unit for receiving and storing VCR correction information among the read correction information;
   a switching signal input unit for inputting a switching signal for switching driving according to the DVDP driving information over to the driving according to the VCR correction information; and
   a VCR control unit for controlling the VCR by switching over to the driving according to the VCR correction information stored in the VCR correction information storage unit if the switching signal is received through the switching signal input unit.

2. The DVDP/VCR combination system of claim 1, wherein the DVDP correction information storage unit further comprises:
   an area separation storage unit having a VCR correction area for storing VCR correction information and a DVDP information storage area for storing the DVDP correction information retrieved from the DVD.

3. The DVDP/VCR combination system of claim 2, wherein the DVDP and the VCR each comprise:
   a DVDP chip and a VCR chip, respectively 4. The DVDP/VCR combination system of claim 2, wherein the area separation storage unit comprises one of an Electrically Erasable and programmable ROM (EEPROM) and a Read Only Memory (ROM).

5. The DVDP/VCR combination system of claim 3, wherein the area separation storage unit is separate from the DVDP chip and the VCR chip.

6. The DVDP/VCR combination system of claim 1, wherein the DVDP driving information storage unit stores driving information for controlling the DVDP in the deck unit.

7. The DVDP/CR combination system of claim 1, wherein the VCR driving information storage unit stores information for driving the VCR in the deck unit.

8. The DVDP/VCR combination system of claim 1, further comprising:

an On Screen Display (OSD) for adding an OSD function to video signals output from the DVDP/VCR combination system.

9. The DVDP/VCR combination system of claim 1, further comprising:
a Moving Picture Expert Group (MPEG) decoder for processing video signals for the DVDP/VCR combination system.

10. The DVDP/VCR combination system of claim 1, wherein the VCR chip further comprising:
an address searching unit for providing a correction information address that coincides with a switching section address from the VCR correction information storage unit.

11. A method of providing a Digital Video Disc Player/Video Cassette Recorder (DVDP/VCR) combination system having a DVDP and a VCR provided with a DVDP driving information storage unit and a VCR driving information storage unit, respectively, the DVDP/VCR combination system being adapted to control the DVDP and the VCR in accordance with DVDP driving information and VCR driving information stored in the DVDP driving information storage unit and the VCR driving information storage unit, respectively, the method comprising:
reading correction information for compensating for at least one of the DVDP driving information and or the VCR driving information from a DVD;
receiving and storing VCR correction information among the read correction information;
inputting a switching signal for switching driving according to the DVDP driving information over to the driving according to the VCR correction information; and
controlling the VCR by switching over to the driving according to the VCR correction information stored in the VCR correction information storage unit if the switching signal is received through the switching signal input unit.

12. The method of claim 11, wherein the receiving and storing step further comprising:
storing VCR correction information and storing the DVDP correction information retrieved from the DVD.

13. The method of claim 11, further comprising:
storing driving information for controlling the DVDP in the deck unit.

14. The method of claim 11, further comprising:
storing information for driving the VCR in the deck unit.

15. The method of claim 11, further comprising:
adding an On Screen Display function to video signals output from the DVDP/VCR combination system.

16. The method of claim 11, further comprising:
processing video signals for the DVDP/VCR combination system.

17. The method of claim 11, further comprising:
providing a correction information address that coincides with a switching section address from the VCR correction information storage unit.

18. The method of claim 11, wherein the DVDP and the VCR each comprise a DVDP chip and a VCR chip, respectively.

* * * * *